CATHODE RAY TUBE CIRCUIT TO MAINTAIN UNIFORM TRACE INTENSITY

Filed Nov. 22, 1955 2 Sheets-Sheet 1

INVENTOR
B. McKIM
BY
ATTORNEY

FIG. 2
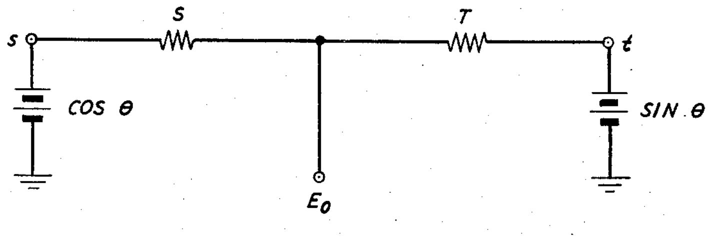
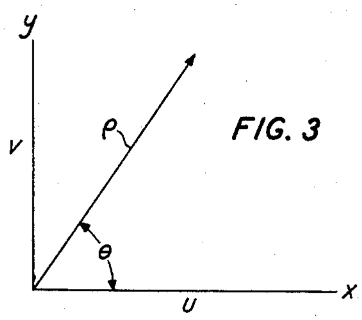
FIG. 3
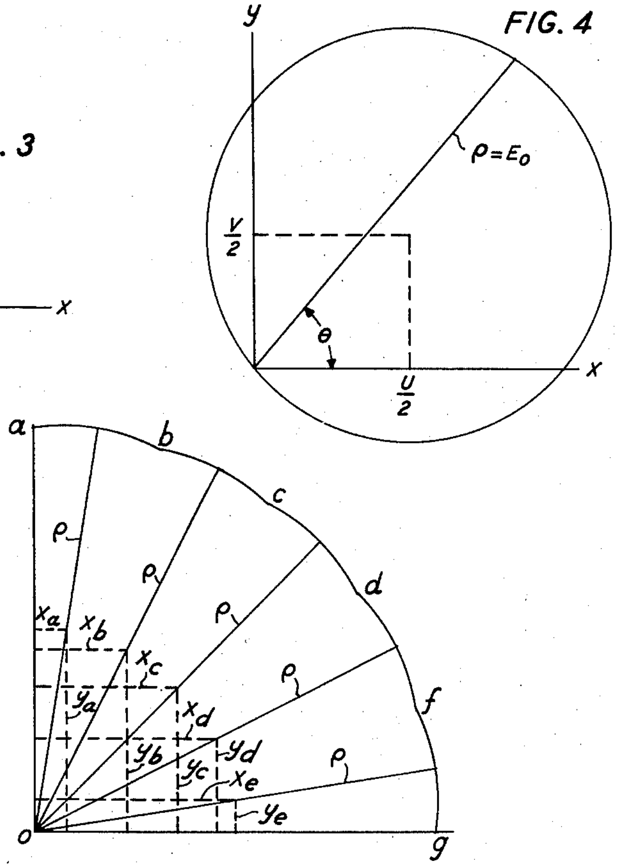
FIG. 4, FIG. 5
FIG. 6
| ITEM NOS. | 22 AND 22a | 20 AND 20a | 21 AND 21a | 24 AND 24a | 25 AND 25a |
|---|---|---|---|---|---|
| VALUE | 1 | 1.039 | 6.562 | .2298 | .6353 |
INVENTOR
B. McKIM
BY [signature]
ATTORNEY United States Patent Office 2,860,284

Patented Nov. 11, 1958

2,860,284

CATHODE RAY TUBE CIRCUIT TO MAINTAIN UNIFORM TRACE INTENSITY

Burton McKim, Morristown, N. J., assignor to Bell Telephone Laboratories, Incorporated, New York, N. Y., a corporation of New York Application November 22, 1955, Serial No. 548,388

9 Claims. (Cl. 315—22)

This invention relates to cathode ray tube circuits and more particularly to such circuits in which the electron beam is compensatorily modulated to provide a trace of constant intensity irrespective of changes in beam writing speed.

Cathode ray tube beam compensatory circuits have heretofore been proposed, illustrative of which are those disclosed in Patents 2,313,967, issued to Sidney Read, Jr. on March 16, 1943, and 2,418,133, issued to Merton R. Miller on April 1, 1947. Known circuits, however, while providing compensation in certain specific applicatons, are limited in versatility and do not provide substantially exact compensation when both the vertical and horizontal components of trace velocity vary widely in sweeps across the oscilloscope screen. In addition, known circuits employ electron discharge devices together with transformers and required attendant circuitry to perform beam compensatory functions, thereby adding to complexity, bulk, and cost.

One basic object of this invention is to improve cathode ray tube compensatory devices. More specifically, object are to increase simplicity and versatility in such devices, to reduce cost, and to provide compensation required to maintain uniform trace intensity.

Accordingly, in accordance with one feature of this invention, a simple and inexpensive passive network is provided for differentiating $x$ and $y$ coordinate deflection voltages, thereby to produce output voltages bearing linear relationships to the time-rates-of-change of the respective deflection voltages.

In accordance with another feature of this invention, a simple passive network is provided to produce an output voltage proportional to the root-mean-square of the differentiated $x$ and $y$ coordinate deflection voltages, thereby providing an output voltage corresponding to the instantaneous resultant velocity of the beam upon the inner surface of the face of the tube.

In accordance with yet another feature of this invention, the root-mean-square output voltage is applied to the cathode ray tube control grid to compensatorily modulate the electron beam.

The invention and the above-noted and other features thereof will be more fully understood from the following detailed description with reference to the accompanying drawing in which:

Fig. 2 is a schematic diagram of an elementary explanatory circuit;

Fig. 3 is a vector diagram relating to the elementary circuit of Fig. 2;

Fig. 4 is a more developed vector diagram relating to the elementary circuit of Fig. 2;

Fig. 5 is a diagram of the output voltage of the root-mean-square circuit depicted in Fig. 1, while Fig. 6 is a table of illustrative values for certain of the elements shown in the circuit of Fig. 1.

Figure 1:
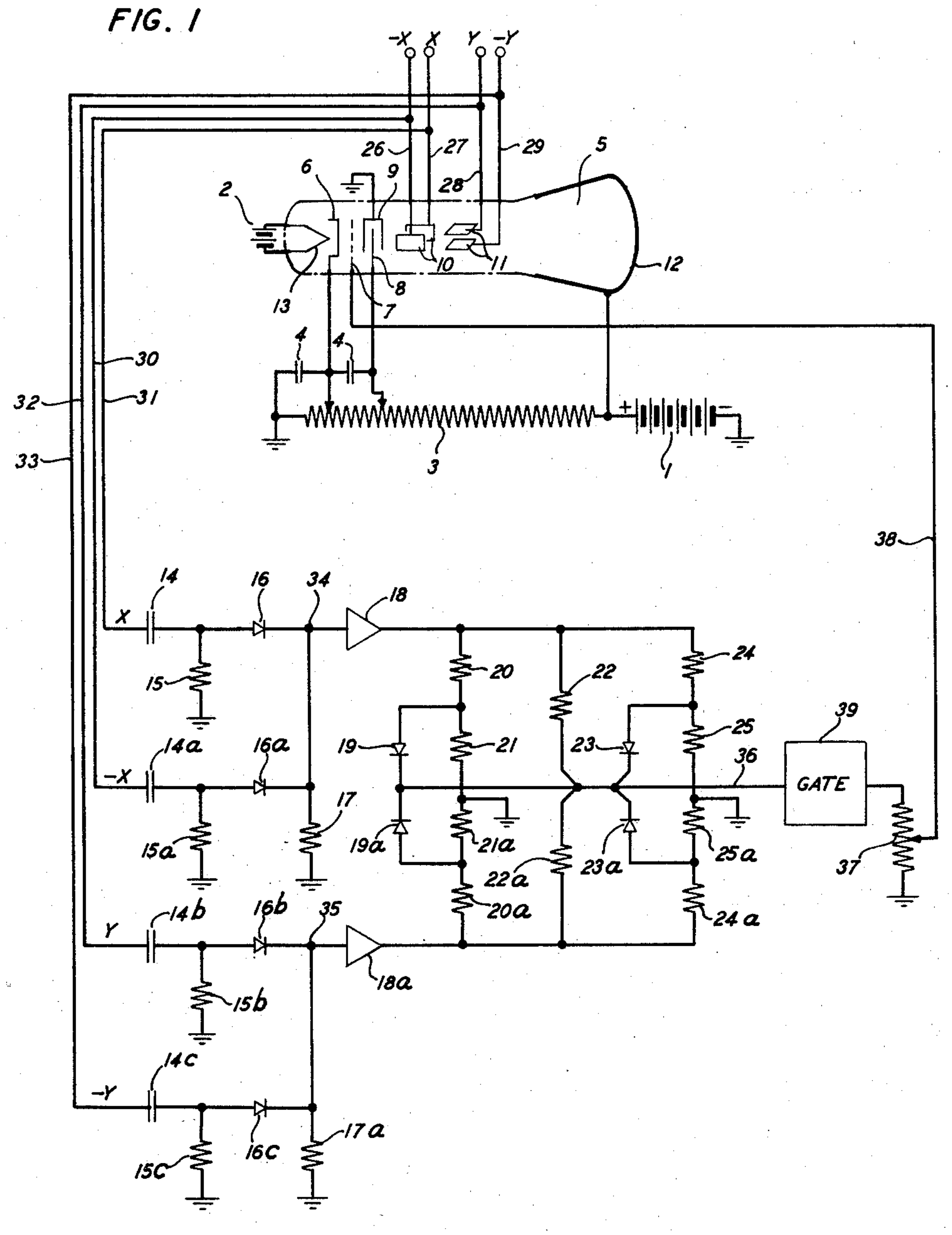
Fig. 1 is a schematic wiring diagram of an embodiment of the invention.

Referring to Fig. 1, a conventional electrostatic deflection type cathode ray tube 5 is shown. This tube has a filament 13, a source of electrons 6, a control grid 7, an isolating electrode 9, an accelerating electrode 8, horizontal beam deflecting plates 10, vertical beam deflecting plates 11 and a target 12. A battery 2 is shown to provide a source of current for heating the filament 13, and battery 1 together with voltage divider resistor 3 provide bias and accelerating potentials to the various electrodes. Capacitors 4 are provided to by-pass the accelerating electrode 8 and the cathode 6 to ground.

As will be recognized by those skilled in the art, the cathode 6 is heated by the filament 13 and thereupon emits electrons which are attracted along the neck of the tube toward electrode 8 by the electric field existing between said electrode and the cathode. The control grid 7 controls or modulates the flow of electrons by changing the aforementioned electric field in accordance with changing potentials which may be impressed upon it. Physical design of electrode 8 is such that the majority of electrons attracted to it pass through and beyond in the direction of the target 12. They must, however, pass through two additional electric fields oriented at right angles to the path of the beam and at right angles to each other, these two fields being provided by potentials impressed upon the horizontal deflection plates 10 and the vertical deflection plates 11. The moving electrons, in passing through these electric fields, are deflected, the amount of deflection being a function of the strength of the fields. After passing through these fields, the electrons continue their travel until they impinge upon the target 12. This target is coated with fluorescent material which emits light in response to bombardment by electrons, thereby providing a visual trace upon the face of the tube.

Looking at the face of the tube and applying a set of rectangular coordinates thereto on the surface thereof, the $y$ to coordinate will refer to displacement in the vertical direction and the $x$ coordinate will refer to displacement in the horizontal direction. The $z$ coordinate will refer to displacement at right angles to the center of the face of the tube.

It will be recognized that the magnitude of deflection of the electron beam, as it passes through the electric fields produced by each of the sets of plates 10 and 11, will be proportional to the strength of each field and inversely proportional to the $z$ axis velocity of the electrons. This relationship may be expressed as $$D_x = \frac{Ke_x}{v_z}$$

where $D_x$ is deflection in the $x$ direction, K is a constant, $e_x$ is the strength of the electric field between the plates 10 and $v_z$ is the $z$ axis velocity of the electrons. A similar expression defines deflection of the electron beam in the $y$ direction. These equations, however, are applicable only (as in the cathode ray tube) where the electric field is at right angles to the direction of travel of the electrons. Differentiating the above two equations with respect to time, and holding the electron velocity constant, said equations become $$\frac{dD_x}{dt} = \frac{Kde_x}{v_z dt} \text{ and } \frac{dD_y}{dt} = \frac{Kde_y}{v_z dt}$$

for the $x$ and $y$ axis, respectively, thus showing that the change of displacement in both the $y$ and $x$ directions with respect to time, that is, the $x$ and $y$ beam velocity components, are proportional to the time rates of change of the electric fields produced by the beam deflecting plates. Inasmuch as the time rates of change of the electric fields are linearly proportional to the time rates of change of the voltages producing the fields, it follows that the $x$ and $y$ beam velocity components are proportional to the time rates of change of the voltages impressed upon the aforementioned beam deflecting plates.

Difficulty has heretofore been encountered in visual and photographic observations of cathode ray tube traces in instances in which transients or other phenomena having widely differing beam writing speeds have been observed. The reason for this is that the intensity of light emitted from the bombarded segment of the screen is a function of the total quantity of electrons impinging thereon (where $z$ axis velocity is constant) and it will be obvious that, with an electron beam of uniform density and constant $z$ axis velocity, the light emitted from a given segment will be an inversely related function of the velocity of the point of impact of the beam upon the target. Thus when the velocity of the point of impact varies widely, the resulting trace may in part be well illuminated and in part so poorly illuminated as to be unobservable.

The aforementioned difficulty may be most advantageously overcome by compensatorily modulating electron beam, that is, by changing its sectional density to maintain a constant total number of electrons impinging upon each tiny target area as the beam is swept across the tube inner face. The device for accomplishing this objective is the subject-matter of this invention and will now be explained in detail.

Again referring to the drawing (Fig. 1), four input terminals $-x$, $x$, $y$ and $-y$ are provided for the introduction of voltages, the characteristics of which it is desired to be observed on the screen 12. Connections from these terminals are individually made to the horizontal and vertical deflection plates 10 and 11 via conductors 26, 27, 28 and 29, respectively, and are also made via conductors 30, 31, 32 and 33, respectively, to capacitors **14*a*, 14, 14*b* and 14*c*. Each of these capacitors together with its associated resistor 15*a*, 15, 15*b* or 15*c*** forms a passive differentiator, as is well known in the art, that produces an output voltage linearly proportional to the time rate of change of the voltage impressed thereon.

It is desired that only differentiated voltages of positive polarity be impressed upon resistors 17 and **17*a*, for, although the voltages impressed upon any of the terminals $-x$, $x$, $y$ and $-y$ may be either positive or negative with respect to ground, the root-mean-square circuit, hereinafter to be described, is operative only in response to voltages of like polarity, which in the present embodiment is positive. Asymmetrical current devices 16, 16*a*, 16*b* and 16*c* are therefore provided to prevent differentiated voltages of negative polarity from being impressed upon resistors 17 and 17*a*. Accordingly, at point 34, there will appear a positive voltage linearly proportional to the magnitude of velocity of the point of impact of the beam upon the face of the tube in the $x$ direction, while at point 35 will appear a positive voltage which is linearly proportional to the magnitude of the velocity of the point of impact of the beam upon the face of the tube in the $y$ direction. The voltages appearing at points 34 and 35** are, therefore, not $$\frac{dx}{dt} \text{ and } \frac{dy}{dt}\text{, respectively, but} +\left|\frac{dx}{dt}\right| \text{ and } +\left|\frac{dy}{dt}\right|\text{, respectively}$$

Amplifiers 18 and **18*a***, which may be conventional cathode followers, are provided to isolate the root-mean-square device, hereinafter described, from the preceding circuitry, thereby to prevent loading the differentiators in a manner that might prevent faithful differentiation.

The resultant velocity of the point of impact of the beam in the $xy$ plane will be the vector sum of the magnitude of its $x$ and $y$ velocity components, that is, the square root of the sum of the squares of the individual horizontal and vertical velocity components. The two voltages appearing at points 34 and 35 as previously mentioned, are therefore fed into a network, the output of which is proportional to the root-main-square of the two input voltages. An explanation of this root-mean-square circuit now follows:

Referring to Fig. 2, two resistors S and T are connected in series with voltage sources cos $\theta$ and sin $\theta$. As is indicated by their identifying symbols, these two voltages are proportional in magnitude to the cosine of and sin of $\theta$, respectively, where $$\theta=\tan^{-1}\frac{y}{x}$$

$y$ and $x$ being the instantaneous values of the vertical and horizontal deflection voltages, respectively. The open circuit voltage at the connection between the resistors is of interest and may be found as follows:

Applying Ohm's law to the series circuit, $$I=\frac{\Sigma E}{\Sigma R}=\frac{\sin\theta-\cos\theta}{S+T} \quad (1)$$

and the voltage at the midpoint $$Eo=\sin\theta-IT \quad (2)$$

Substituting I of Equation 1 in Equation 2 we obtain $$Eo=\sin\theta-\left[\frac{T\sin\theta-T\cos\theta}{S+T}\right] \quad (3)$$

which in simplified form is $$Eo=\frac{T\cos\theta+S\sin\theta}{S+T} \quad (4)$$

Substituting U and V, respectively, for $$\frac{T}{S+T} \text{ and } \frac{S}{S+T}$$

in Equation 4, gives $$Eo=U\cos\theta+V\sin\theta \quad (5)$$

It will be recognized that $$U\cos\theta+V\sin\theta=\rho \quad (6)$$

where $\rho$ is the radius vector in polar coordinates.

This may be proved by referring to Fig. 3 in which $U=\rho\cos\theta$ and $V=\rho\sin\theta$. Substituting these values in Equation 6, $$\rho=(\rho\cos\theta)(\cos\theta)+(\rho\sin\theta)(\sin\theta)$$
$$\rho=\rho(\cos^2\theta+\sin^2\theta)$$

As $\cos^2\theta+\sin^2\theta=1$, the expression becomes $\rho=\rho$, thus proving the validity of Equation 6.

Converting Equation 6, $\rho=U\cos\theta+V\sin\theta$, to Cartesian coordinates results in the expression $$X=\rho\cos\theta=U\cos^2\theta+V\sin\theta\cos\theta \quad (7)$$

where $$\sin\theta=\frac{Y}{(X^2+Y^2)^{1/2}} \quad (8)$$

and $$\cos\theta=\frac{X}{(X^2+Y^2)^{1/2}} \quad (9)$$

Substituting Equations 8 and 9 in Equation 7 gives $$X=U\frac{X^2}{(X^2+Y^2)}+V\frac{XY}{(X^2+Y^2)} \quad (10)$$

which, being reduced, gives $$X^2+Y^2=UX+VY \quad (11)$$

which can be converted to $$\left(X-\frac{U}{2}\right)^2+\left(Y-\frac{V}{2}\right)^2=\frac{U^2+V^2}{4} \quad (12)$$

Equation 12 will be recognized as the equation that defines a circle passing through the origin and centered at $$\frac{U}{2} \text{ and } \frac{V}{2}$$

as shown in Fig. 4. By varying the magnitudes of U and V, the center of the circle may be moved to any position within the quadrant shown, and the open circuit output voltages E$o$ equals $\rho$ as hereinbefore explained, where $\rho$ is the radius vector from the origin to that point on the circle (lying within the quadrant) determined by the angle $\theta$, where $\theta$ is equal to $$\tan \frac{-1Y}{X}$$

and where X and Y are the instantaneous magnitudes of the voltages cos $\theta$ and sin $\theta$ impressed upon the terminals S and T, respectively (Fig. 2). The output voltage E$o$, however, is not the vector sum of cos $\theta$ and sin $\theta$. In order for it to be so, it would be necessary for E$o$ (or $\rho$) to equal $[\sin^2 \theta + \cos^2 \theta]^{1/2}$, which is the equation of a circle about the origin.

Now referring to Fig. 5, it will be noted that five different points are located at the centers of circles, the points being $x_a y_a$, $x_b y_b$, $x_c y_c$, $x_d y_d$ and $x_e y_e$. These points are equidistant from the origin $o$ and are determined by dividing the 90-degree quadrant into 5 equal segments of 18 degrees each. The $x$ and $y$ coordinates of these points are then located in accordance with the circle radius times the sines and cosines of the angles 9 degrees, 27 degrees, 45 degrees, 63 degrees and 81 degrees. As is shown in Fig. 5, arcs of the circles drawn about these centers form a five-petalled figure *a—b—c—d—f—g* which closely approximates a quarter circle having radius $\rho$. It is obvious that provision of additional circle center points will cause the petalled figure to more nearly approach a true quarter circle. However, in the present embodiment of this invention, five petals are shown in order to more readily demonstrate the principles underlying the invention, and also to show that a high degree of accuracy may be obtained with five petals as shown.

The root-mean-square network disclosed in Fig. 1 comprising resistors 20, 20*a*, 21, 21*a*, 22, 22*a*, 24, 24*a*, 25 and 25*a* together with asymmetrical current devices 19, 19*a*, 23 and 23*a*, produces an output voltage in network output conductor 36, the magnitude of which is defined by the aforementioned petal-shaped curve of Fig. 5. It will be noted that five pairs of resistors listed in the table of Fig. 6 are provided to establish the five circle centers mentioned above. It should be noted that the order of magnitude chosen for resistors 20 to 25*a* is not critical. In fact, the most advantageous value may vary somewhat in dependence upon such factors as the characteristics of the cathode ray tube and the forward and back resistances of the associated asymmetrical current devices. However, once a value is chosen for one of them, the relationship of it to the others should closely approximate that disclosed in the table of Fig. 6. One operative value for resistors 22 and 22*a* is, for example, 10,000 ohms. The four asymmetrical current devices 19, 19*a*, 23 and 23*a* are provided to prevent flow of current in the reverse direction to resistor paths having a potential less than the output point. This results in chopping off those parts of the circles which would otherwise be nearer the origin $o$ (Fig. 5) than the points *b*, *c*, *d* and *f*. When $\theta<18$ degrees, asymmetrical current devices 19 and 23 are conductive; when 18 degrees $<\theta<36$ degrees, device 19 conducts, when 36 degrees $<\theta<54$ degrees, none of the four root-mean-square network asymmetrical current devices conduct, when 54 degrees $<\theta<72$ degrees, device 19*a* conducts, and when 72 degrees $<\theta<90$ degrees, devices 19*a* and 23*a* conduct.

Inasmuch as the locus of the output E$o$ now approximates a quarter circle with its center at the origin, it will provide a nearly exact root-mean-square output which, in magnitude, will be essentially .707 times the square root of the sum of the squares of the two input voltages.

As hereinbefore explained, the magnitude of the root-mean-square voltage is proportional to the beam writing speed, and may be fed through a conventional gate 39 to voltage divider resistor 37 and via conductor 38 to the cathode ray tube control grid 7 to compensatorily modulate the electron beam. The beam may be thereby modulated to produce even illumination of the visual trace upon the face of the tube. The gate 39 is not a part of this invention and is shown only to illustrate one conventional device for blanking the beam during the return trace. The adjustable voltage divider resistor 37 is provided to allow variation of the compensatory voltage impressed upon the grid 7 in accordance with whether exact compensation, under compensation, or over compensation is desired.

While I have illustrated my invention by a particular embodiment thereof, said invention is not limited in its application to the specific apparatus and particular arrangement therein disclosed. Various applications, modifications and arrangements of the invention will readily occur to those skilled in the art. For example, the hereinbefore described apparauts may also perform beam compensatory functions when connected to cathode ray tubes of the magnetic deflection type.

The terms and expressions which I have employed in reference to the invention are used as terms of description and not of limitation, and I have no intention in the use of such terms and expressions of excluding equivalents of the features shown and described or parts thereof, but on the contrary, intend to include therein any and all equivalents, modifications and adaptations which may be employed without departing from the spirit of the invention.

What is claimed is:

1. In a cathode ray device, the method of producing a voltage proportional to the velocity of the point of incidence of a beam upon the target of said device, which comprises the steps of differentiating the vertical and horizontal beam deflection voltages with respect to time and deriving therefrom another voltage proportional to the resultant thereof, said another voltage being proportional to said velocity of said point of incidence of said beam upon said target of said device.

2. A ray control device comprising in combination means to produce a ray, means to direct said ray to a target, means to vary the intensity of said ray, means to vary the point of incidence of said ray upon said target in three different directions, passive electrical means to derive a voltage having a constant relationship to the instantaneous velocity of said point of incidence of said ray upon said target in said three different directions, and means to apply said voltage to said intensity varying means to vary the intensity of said ray.

3. A device in accordance with claim 2 wherein the derived voltage is proportional to the instantaneous velocity of the point of incidence of the ray upon the target.

4. A charged particle control device comprising in combination means to produce charged particles, means to direct said particles to a target, means to vary the quantity per unit time of said particles impinging upon said target, means to change the point of incidence of said particles upon said target in at least three different directions, passive electrical means to derive a voltage having a constant relationship to the instantaneous velocity of said point of incidence of said particles upon said target in said at least three different directions, and means to apply said voltage to said quantity varying means to vary the quantity per unit time of said particles impinging upon said target.

5. A device in accordance with claim 4 wherein the derived voltage is proportional to the instantaneous velocity of the point of incidence of the particles upon the target.

6. An electron beam control device comprising in combination means to generate an electron beam, a target for said beam, means to direct said beam to said target, means to vary the density of said beam, means to vary the point of incidence of said beam upon said target in both a vertical and a horizontal direction, passive electrical means to derive a voltage proportional to the instantaneous velocity of said point of incidence of said beam when said point of incidence is changing in both a vertical and a horizontal direction, and means to apply said voltage to said density varying means to vary the density of said beam.

7. An electron beam control device comprising in combination means to generate an electron beam, a target for said beam, means to direct said beam to said target, means to modulate said beam, means to vary the point of incidence of said beam upon said target in both a vertical and a horizontal direction, passive electrical means to derive a voltage proportional to the instantaneous velocity of said point of incidence of said beam when said point of incidence is changing in both a vertical and a horizontal direction, and means to apply said voltage to said modulating means to modulate said beam.

8. An electron beam control device comprising in combination means to generate an electron beam, a target for said beam, means to direct said beam to said target, means to modulate said beam, means to vary the point of incidence of said beam upon said target, passive electrical means to derive voltages proportional to the horizontal and vertical components of the velocity of said point of incidence of said beam, other passive electrical means connected to said passive electrical means to derive another voltage proportional to the resultant of said voltages, and mean to apply said other voltage to said modulating means to modulate said beam.

9. An electron beam compensatory device comprising in combination means to generate an electron beam, a target for said beam possessing the property of luminescence in response to electron bombardment, means to direct said beam to said target, means to modulate said beam, means to vary the point of incidence of said beam upon said target, passive electrical means to derive voltages proportional to the horizontal and vertical components of the velocity of said point of incidence of said beam, other passive electrical means connected to said passive electrical means to derive another voltage proportional to the resultant of said voltages, and means to apply said other voltage to said modulating means for compensatory modulation to provide substantially uniform light emission from each bombarded segment of said target.

References Cited in the file of this patent

UNITED STATES PATENTS 2,449,524 Witherby ------------- Sept. 14, 1948
2,700,741 Brown ---------------- Jan. 25, 1955